Jan. 17, 1928.
D. B. DISS ET AL
1,656,512
CASTER
Filed Feb. 6, 1925
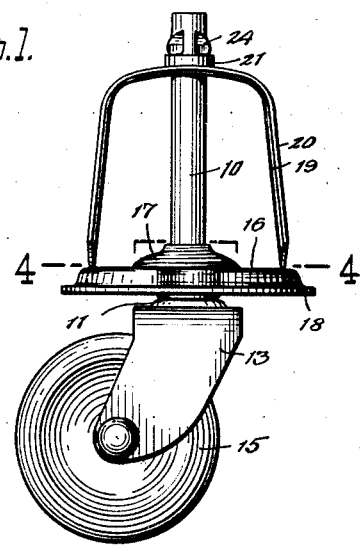
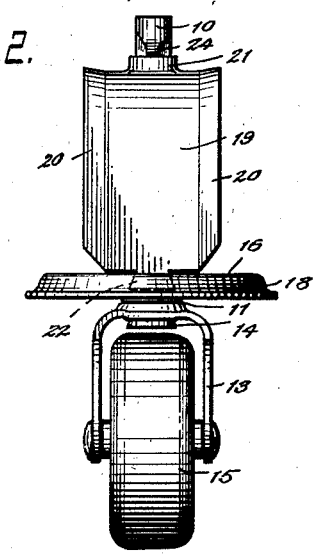
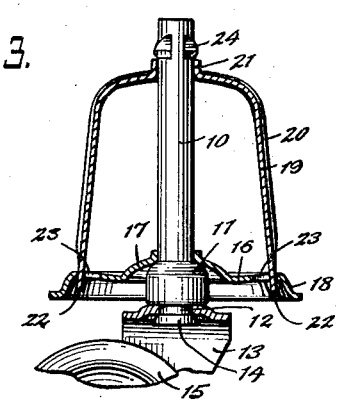
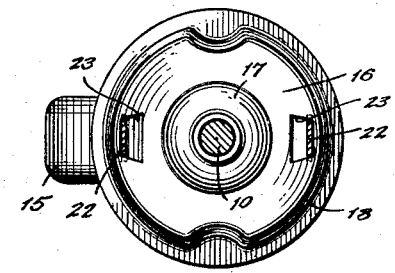
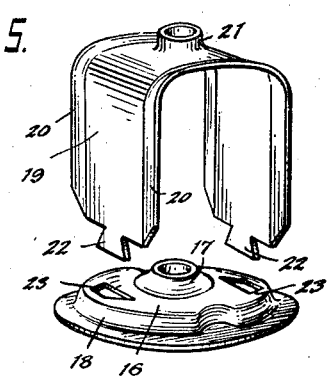
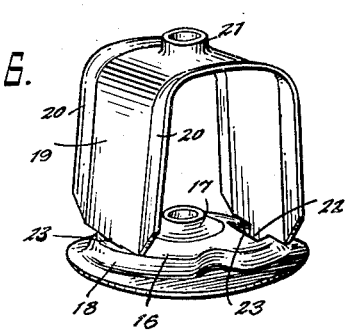
INVENTORS.
DANIEL B. DISS - AND -
OTTO E. HAMTIL.
BY
ATTORNEY.

Patented Jan. 17, 1928.

1,656,512

UNITED STATES PATENT OFFICE.

DANIEL B. DISS, OF NEWARK, AND OTTO E. HAMTIL, OF RAHWAY, NEW JERSEY, ASSIGNORS TO THE BASSICK COMPANY, OF BRIDGEPORT, CONNECTICUT, A CORPORATION OF CONNECTICUT.

CASTER.

Application filed February 6, 1925. Serial No. 7,236.

The present invention relates to an improved caster, particularly of the type adapted for use on the hollow metal posts of bedsteads, or the like, and has for an object to provide a caster which may be easily inserted in the post, will be securely held therein, and will not readily become disengaged or broken.

In particular, it is proposed to provide a caster of the lock spring type, that is, one employing a compressible spring connected to the base, and adapted to be inserted in the hollow post, and which serves to securely maintain the caster in place. The production of such casters is such that considerable tolerance is allowed in the fit of the parts, and in use this tolerance is such that varying strains are set up between the parts, which causes a canting action between the spindle and its bearing tending to twist or warp the latter, this action being sufficient under some conditions to cause separation between the parts, and especially between the spring and base.

An object of the invention therefore is to provide a construction in which the resistance to a canting action is relatively great, and in which an interlocking relation is provided between the spring and base which prevents any possibility of their derangement or separation.

Other objects are to provide a caster of simple and reliable construction, and which may be economically manufactured and assembled.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a side elevation of a caster, according to the present embodiment of the invention;

Fig. 2 is an end elevation thereof;

Fig. 3 is a vertical sectional view of the same, with portions of the horn and wheel broken away;

Fig. 4 is a sectional plan view, taken along the line 4—4 of Fig. 1;

Fig. 5 is a perspective view of the spring and base members employed, and showing the spring compressed and about to be inserted in the base; and Fig. 6 is a perspective view of the same parts in assembled relation, the spring member being expanded and interlocked with the base member.

Similar reference characters indicate corresponding parts throughout the several figures of the drawings.

Referring to the drawings, the caster, according to the present embodiment of the invention, comprises a central vertical spindle 10 provided at its lower end with a rounded thrust bearing portion or head 11 and a reduced bearing portion 12, upon which portion 12 the upper transverse portion of the horn 13 is rotatably secured by upsetting the end of the spindle, as at 14. A roller or wheel 15 is rotatably supported in the horn.

A centrally apertured circular base plate 16 is supported on the spindle, and includes a rounded upwardly pressed bearing portion 17 surrounding the central aperture and engaging the thrust bearing portion 11, and a peripheral downwardly bent and laterally flanged rim portion 18.

The spring 19 is of inverted U-shape, being provided along its vertical edges with angularly bent marginal portions 20 to give rigidity to the structure, and provided at its upper transverse portion with an upwardly flanged apertured bearing portion 21, aligned with the central aperture of the base plate and adapted to be engaged with the spindle 10 near its upper end.

At the lower edges of each of the legs of the spring member there are respectively provided downwardly projecting dove-tail extensions 22, adapted to be interlockingly engaged in diametrically opposite dove-tail openings 23 provided in the base plate, the side walls of the openings converging toward the outer periphery of the plate.

The spring member and base plate are assembled as a unit before being engaged upon the spindle, the spring being first compressed ot its sides, as shown in Fig. 5, to bring the relatively wide lower edges of the dove-tail extensions 22 into line with the relatively wide inner ends of the openings 23, being then inserted in the openings and allowed to expand to bring the narrow upper portions of the extensions into interlocking relation with the narrow outer ends of the openings, as shown in Fig. 6. It will be noted that in this expanded interlocked relation the sides of the spring are divergent, and the base plate is dished slightly upon an incline, so that its surface is at substantially right angles to the surface of the spring sides, and the extensions 22 therefore engage snugly and flatly against the outer walls of the openings 23.

The spring and the base plate assembly unit is now engaged upon the spindle and is secured thereon to permit of relative rotation by pinching out the metal of the spindle above and adjacent the upper end of the spring, as at 24. Upon insertion in the tubular post of the bedstead, or the like, the spring is slightly compressed and through outward pressure securely retains the caster in place.

The interlocking relation between the spring and the base plate is such that canting action of the spindle is resisted, and the possibility of separating the connection of the interlocking parts, and breakage and warping, is entirely prevented. The invention has the further advantage that the base plate and spring assembly units may be made up in quantities, before attachment to the spindles, the interlocking construction permitting the assembled base plate and spring to be shipped in bulk, as between one plant or shop and another, without separation, thereby greatly facilitating the manufacture of the casters.

We have illustrated and described a preferred and satisfactory embodiment of the invention, but it will be obvious that changes may be made therein, within the spirit and scope thereof, as defined in the appended claims.

Having thus described our invention, what we claim and desire to secure by Letters Patent is:—

1. In a caster, a spindle including a thrust bearing portion and a floor engaging element, a centrally apertured base plate rotatably engaged upon said spindle and having a bearing on said thrust bearing portion, a spring member having a bearing portion in which said spindle is engaged in spaced relation to said base plate and side leg portions adapted to be outwardly expanded and inwardly compressed, and interlocking separable connection means between said side leg portions and said base plate, whereby said side leg portions are limited in their outward expansion and are held against relative rotation with respect to said base plate in both expanded and compressed positions, said side leg portions being interlockingly connected in their expanded relation and adapted to be separated from said base plate in their compressed relation.

2. In a caster, a spindle including a thrust bearing portion and a floor engaging element, a centrally apertured base plate rotatably engaged upon said spindle and having bearing on said thrust bearing portion, a spring member having a bearing portion in which said spindle is engaged in spaced relation to said base plate, said base plate having openings, said spring member having side leg portions adapted to be compressed and expanded and shouldered extensions at the lower ends of said side leg portions adapted in the compressed position of said side leg portions to be inserted in said openings and in the expanded position to be interlockingly connected to said base member and being limited in their compressed and expanded positions by abutment with the inner and outer edges of said openings, said side leg portions being compressible inwardly from their normal expanded position.

3. In a caster, a spindle including a thrust bearing portion and a floor engaging element, a centrally apertured base plate rotatably engaged upon said spindle and having bearing on said thrust bearing portion, a spring member having a bearing portion in which said spindle is engaged in spaced relation to said base plate, said base plate having openings relatively wide at their inner ends and relatively narrow at their outer ends, said spring member having side leg portions adapted to be compressed and expanded and extensions at the lower ends of said side leg portions having a relatively narrow portion adjacent the lower edges of said side leg portions and a relatively wide lower end portion, and adapted in the compressed postion of said side leg portions to be inserted in said openings and in the expanded position to be interlockingly connected to said base member, said side leg portions being compressible inwardly from their normal expanded postion.

4. In a caster, a spindle including a thrust bearing portion and a floor engaging element, a centrally apertured base plate rotatably engaged upon said spindle and having bearing on said thrust bearing portion, a spring member having a bearing portion in which said spindle is engaged in spaced relation to said base plate, said base plate having dove-tail openings relatively wide at their inner ends and relatively narrow at their outer ends, said spring member having side leg portions adapted to be compressed and expanded and dove-tail extensions at the lower ends of said side leg portions having a relatively narrow portion adjacent the lower edges of said side leg portions and a relatively wide lower end portion, and adapted in the compressed position of said side leg portions to be inserted in said openings and in the expanded position to be interlockingly connected to said base member, said side leg portions being compressible inwardly from their normal expanded position.

5. In a caster, a spindle including a floor engaging element, a base plate rotatable on said spindle and having openings, and a spring member having side leg portions provided at their lower ends with shouldered extensions disposed in the planes of said side leg portions and interlockingly engaged in said openings and compressible inwardly from their normal expanded position.

6. In a caster, a spindle including a floor engaging element, a base plate rotatable on said spindle and having a pair of diametrically opposed openings inwardly spaced from its periphery, and a spring member having side leg portions provided at their lower ends with shouldered extensions engaged in and having inward and outward movement in both of said openings and adapted to interlockingly connect said spring member to said base plate, and being limited in their compressed and expanded positions by abutment with the inner and outer edges of said openings, said side leg portions being compressible inwardly from their normal expanded position.

7. A base plate and spring unit for casters, comprising a centrally apertured base plate having a pair of diametrically opposed openings inwardly spaced from its periphery, and a spring member of inverted U-shape having shouldered extensions interlockingly engaged in said openings of said base plate having inward and outward movement in both of said openings and connecting said base plate and spring member, the shoulders engaging the upper surface of said base plate and the extensions projecting below said upper surface.

8. A base plate and spring unit for casters, comprising a centrally apertured base plate having openings relatively wide at their inner ends and relatively narrow at their outer ends, and a spring member having side leg portions adapted to be compressed and expanded and extensions at the lower ends of said side leg portions having a relatively narrow portion adjacent the lower edges of said side leg portions and a relatively wide lower end portion, and adapted in the compressed position of said side leg portions to be inserted in said openings and in the expanded position to be interlockingly connected to said base member, said side leg portions being compressible inwardly from their normal expanded position.

Signed at Newark, in the county of Essex, and State of New Jersey, this 20th day of January, 1925.

DANIEL B. DISS.
OTTO E. HAMTIL.